United States Patent
Lee et al.

(10) Patent No.: US 8,774,502 B2
(45) Date of Patent: Jul. 8, 2014

(54) METHOD FOR IMAGE/VIDEO SEGMENTATION USING TEXTURE FEATURE

(75) Inventors: Gwo Giun (Chris) Lee, Tainan (TW); Chun-Fu Chen, Tainan (TW); He-Yuan Lin, Tainan (TW)

(73) Assignee: National Cheng Kung University, Tainan (TW)

( * ) Notice: Subject to any disclaimer, the term of this patent is extended or adjusted under 35 U.S.C. 154(b) by 121 days.

(21) Appl. No.: 13/456,289

(22) Filed: Apr. 26, 2012

(65) Prior Publication Data

US 2012/0301018 A1 Nov. 29, 2012

Related U.S. Application Data

(60) Provisional application No. 61/478,965, filed on Apr. 26, 2011.

(51) Int. Cl.
*G06K 9/00* (2006.01)

(52) U.S. Cl.
USPC .......................................................... 382/164

(58) Field of Classification Search
CPC .................. G06F 17/30802; G06F 17/30808; G06F 17/30262; G06K 9/00; G06K 9/00604; G06K 9/0067; G06K 9/0061; G06K 9/0063; G06K 9/00711; G06K 9/00718; G06K 9/00798; G06K 9/3241; G06K 9/4614; G06K 9/6292; G06T 5/001; G06T 5/20; G06T 7/0083; G06T 7/403; G06T 7/40; H04N 21/44008; H04N 21/440227; H04N 21/8153; H04N 21/8456
See application file for complete search history.

(56) References Cited

U.S. PATENT DOCUMENTS

| | | | | |
|---|---|---|---|---|
| 6,192,150 B1 * | 2/2001 | Leow et al. | | 382/190 |
| 6,721,454 B1 * | 4/2004 | Qian et al. | | 382/224 |
| 6,850,644 B1 * | 2/2005 | Shin et al. | | 382/190 |
| 7,359,555 B2 * | 4/2008 | Porikli et al. | | 382/204 |
| 7,826,676 B2 * | 11/2010 | Porikli | | 382/260 |
| 8,165,407 B1 * | 4/2012 | Khosla et al. | | 382/224 |
| 8,170,293 B2 * | 5/2012 | Tosa et al. | | 382/117 |
| 8,363,913 B2 * | 1/2013 | Boushey et al. | | 382/128 |
| 8,369,595 B1 * | 2/2013 | Derakhshani et al. | | 382/128 |
| 8,487,991 B2 * | 7/2013 | Zhang et al. | | 348/119 |

FOREIGN PATENT DOCUMENTS

CN 1777915 A 5/2006

* cited by examiner

*Primary Examiner* — Jose Couso
(74) *Attorney, Agent, or Firm* — Bacon & Thomas, PLLC (57) ABSTRACT

A method for image/video segmentation, capable of segmenting an image signal for obtaining plural texture color feature regions, by utilizing both of the advantages carried by the texture feature and the color feature is disclosed. The method comprises the following steps: (A) receiving an image signal including plural image pixels; (B) executing a Gabor filtering process and a value operation process on each of the plural image pixels; (C) designating each of the plural image pixels a corresponding texture feature vector basing on the result of the value operation process; (D) executing a segmentation process on the image signal basing on the texture feature vector of each of the plural image pixels, for obtaining plural texture feature regions; and (E) executing a re-segmentation process on plural color feature regions basing on the distribution of the plural texture feature regions, for obtaining plural texture color feature regions.

10 Claims, 5 Drawing Sheets

METHOD FOR IMAGE/VIDEO SEGMENTATION USING TEXTURE FEATURE

CROSS REFERENCE TO RELATED APPLICATION

This application claims the benefit of filing date of U.S. Provisional Application Ser. No. 61/478,965, entitled "Method for Converting from a 2-Dimensional Video to a 3-Dimensional Video" filed Apr. 26, 2011 under 35 USC §119(e)(1).

BACKGROUND OF THE INVENTION

1. Field of the Invention

The present invention relates to a method for image/video segmentation, more particularly to a method capable of combining texture feature of an image signal and color feature of an image signal, and benefiting from the advantages of texture feature and color feature to segmentize an image signal into a plurality of texture color feature regions, so as to increase the accuracy of image signal segmentation.

2. Description of Related Art

Among various computer vision and image processing architecture, the image intensity or the color intensity of a surface of an object within an image signal will be assumed to be approximately uniform. However, such assumption does not fit with the real world what human eyes sees exactly. In addition to image intensity or the color intensity, human eyes can also observe other sorts of subtle variation on the surface of objects, and these subtle variation is the so call texture.

In the past years, scholars used to depict texture as follow: some units that are mostly fundamental are carried in texture image, and characteristic of texture must have been told just by through the "space relationship" between texture fundamental units. Otherwise, some scholars also give the following description on texture: textures appearing to be identical have similar "region characteristics", and these region characteristics may by smoothness, roughness, or regularity.

Focusing on the aforementioned texture characteristics, how to precisely extract the texture characteristics has become an important subject for modern image processing technology, and is worth for further study in the field of computer vision and image processing. In the past literature, Gabor filter bank is widely applied for extracting texture feature, while the impulse response thereof is the multiplication of a Gaussian function and complex exponential. Therefore, Gabor filter has several physical properties on invariant such as translation invariant, scale invariant, and rotation invariant.

However, texture feature is not accommodated into consideration due to the method for image/video segmentation using texture feature which is broadly employed merely concerns about the color feature of an image region, thus, an color feature region of an image signal being unable to be further separated into two sub-regions with different texture feature due to having identical color feature usually occurs, and this confines the accuracy on the successive image recognition.

Therefore, the industry desires for a method for image/video segmentation using texture feature, capable of combining the texture feature and the color feature of an image signal, and utilizing the advantages carried by both texture feature and color feature to segment the image signal into plural texture color feature regions. By the method, the accuracy on image segmentation can be raised.

SUMMARY OF THE INVENTION

The object of the present invention is to provide an image segmentation method for texture feature in order that the texture feature and color feature of an image signal can be combined, and an image signal can be segmented into plural texture color feature regions, utilizing both of the advantages carried by the texture feature and the color feature, so as to increase the accuracy of high image signal segmentation.

In order to achieve the above objective, the method for image segmentation utilizing texture feature of the present invention is to be used to segment an image signal into plural texture color feature regions, comprising the following steps: (A) receiving an image signal including plural image pixels; (B) executing a Gabor filtering process and a value operation process on each of the plural image pixels; (C) designating each of the plural image pixels a corresponding texture feature vector basing on the result of the value operation process; (D) executing a segmentation process on the image signal basing on the texture feature vector of each of the plural image pixels, for making the image signal to have plural texture feature regions and making the image pixels located in identical texture feature regions to have texture feature vectors of identical groups; and (E) executing a re-segmentation process on the plural color feature regions basing on the distribution of the plural texture feature regions, for making at least one color feature region to have plural texture color feature regions.

Wherein, the abovementioned Gabor filters include plural two-dimensional Gabor filters, for which the number of filters is unrestricted, and same is for their way of distribution. However, it is preferred that the abovementioned Gabor filters include an internal subband Gabor filter and an external subband Gabor filter, but the number of which is not restricted, such an arrangement means that the Gabor filters can be bundled with 3 subband Gabor filters (such as internal subband Gabor filters, mid subband Gabor filters, external subband Gabor filters) or more quantity of subband Gabor filters.

Furthermore, the aforementioned internal subband Gabor filters and external subband Gabor filters can each comprise one or more than one two-dimensional Gabor filters, but it is preferred that they each comprise plural two-dimensional Gabor filters, and the quantity of two-dimensional Gabor filters included in each type may not necessarily be required to be the same. However in order to win the best filtering result, it is generally known to make the number of two-dimensional Gabor filters equal for internal subband Gabor filters and external subband Gabor filters.

In addition, for the image segmentation method, the number of the filtering direction of the Gabor filters is equal to the number of two-dimensional Gabor filters. In some situations, this is equivalent to the number of two-dimensional Gabor filters constituting the external subband Gabor filters. Other than this, each of the two-dimensional Gabor filter disposed in the internal subband Gabor filter corresponds to one of the two-dimensional Gabor filters disposed in the external subband Gabor filter, and such internal-external combination sets up to constitute a filtering direction of the aforementioned Gabor filters.

In another perspective of the present invention, a preferred embodiment of the invention for the disposition of the two subband Gabor filters of the Gabor filters is that the internal subband Gabor filters and the external subband Gabor filters are disposed in a concentric fashion. Yet in another perspective of the present invention, the aforementioned two subband Gabor filters can include four to eight two-dimensional Gabor filters, however, six two-dimensional Gabor filters are preferred, meaning that it is preferred for the image segmentation method using texture feature of the present invention to use twelve two-dimensional Gabor filters.

Moreover, in continuation of the above disclosure, since a filtering direction is defined as a direction along which one two-dimensional Gabor filter located in the internal subband Gabor filter extending toward one two-dimensional Gabor filter located in the external subband Gabor filter, the number of Gabor filters used in the image segmentation method using texture feature of the present invention should be concluded to have six filtering direction. It should be noted here that the angles contained between each of the filtering direction is not specifically required to of a particular specification, but a preferred embodiment for such aspect of the invention is that the contained angle between each of the six filtering direction be of a 30°. Furthermore, for the Gabor filters used in the present invention, the first filtering direction can be disposed at any desired angle, but the preferred angle is at a 0°. As such, the remaining filtering directions (the remaining five filtering direction) are disposed at appropriate angles in accordance with the aforementioned setting for contained angles.

In step (B) of the image segmentation method using texture feature of the present invention, the operating value algorithm is preferred to be the resulting magnitude for carrying out the Gabor filtering process. Afterward, the value of the magnitude from the value algorithm is used in step (C), which works to designate each image pixel a corresponding texture feature vector. In other words for describing step (B) from the above, a quantity of n two-dimensional Gabor filters for executing Gabor filtering process denotes that the value algorithm can work out a quantity of n magnitude values. And from such, the value of the quantity of n magnitude is to be used in designating a texture feature vector for an image pixel.

Next after step (D) of the image segmentation method, the plural image pixels of the texture feature vectors belonging to identical groups will be categorized into identical texture feature regions. As such, original image signal (received in step (A)) will be segmented into plural texture feature regions. To further illustrate, executing the aforementioned segmentation method is equal to applying a grouping algorithm, but the type of which is not restricted. Generally speaking, the grouping algorithms for use here include K-means grouping algorithm, CRLA grouping algorithm (constraint run length algorithm), SBKM grouping algorithm (symmetry distance based K-means algorithm), etc. However in the present invention, the preferred embodiment uses K-means grouping algorithm.

For the re-segmentation process in step (E) of the image segmentation method using texture feature of the present invention, a preferred embodiment comprises the following steps: (E1) comparing an area value of a color feature region with a re-segmentation threshold value; and (E2) when the area value of the color feature region is higher than the re-segmentation threshold value, the color feature region is re-segmented to the texture color feature region according the distribution of the texture feature regions in the image signal. Of particular note here is that the aforementioned re-segmentation threshold value is not limited to a fixed option, and a preferred range is between 160 and 200.

Furthermore step (E2) relates to applying a grouping algorithm to re-segment the color feature region into the texture color feature region according to the distribution of image signals in texture feature regions. Similarly, the grouping algorithm used in step (E2) is not limited to a particular choice, and any algorithm capable of achieving the grouping effect can be applied in step (E2). A preferred embodiment for step (E2) uses K-means grouping algorithm, CRLA grouping algorithm, or SBKM grouping algorithm.

Lastly for step (E) of the image segmentation method using texture feature of the present invention, the plural color feature regions of the image signal can be obtained through the following steps: executing a color feature extracting process on the image pixel so as to extract the color feature of the image pixel and to individually designate a color feature vector to the image pixel; applying a grouping algorithm to categorize the image pixels into plural color groups according to the color feature vector designated to the image pixel; and pooling together the color pixels that are adjacent to each other and of identical color groups into identical color feature regions. However, such way of obtaining plural color feature regions included in the image signal is not limited to the above method as they may be obtained through any algorithm that the people of ordinary skills in the relevant art may recognize.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Embodiment 1

Figure 1:
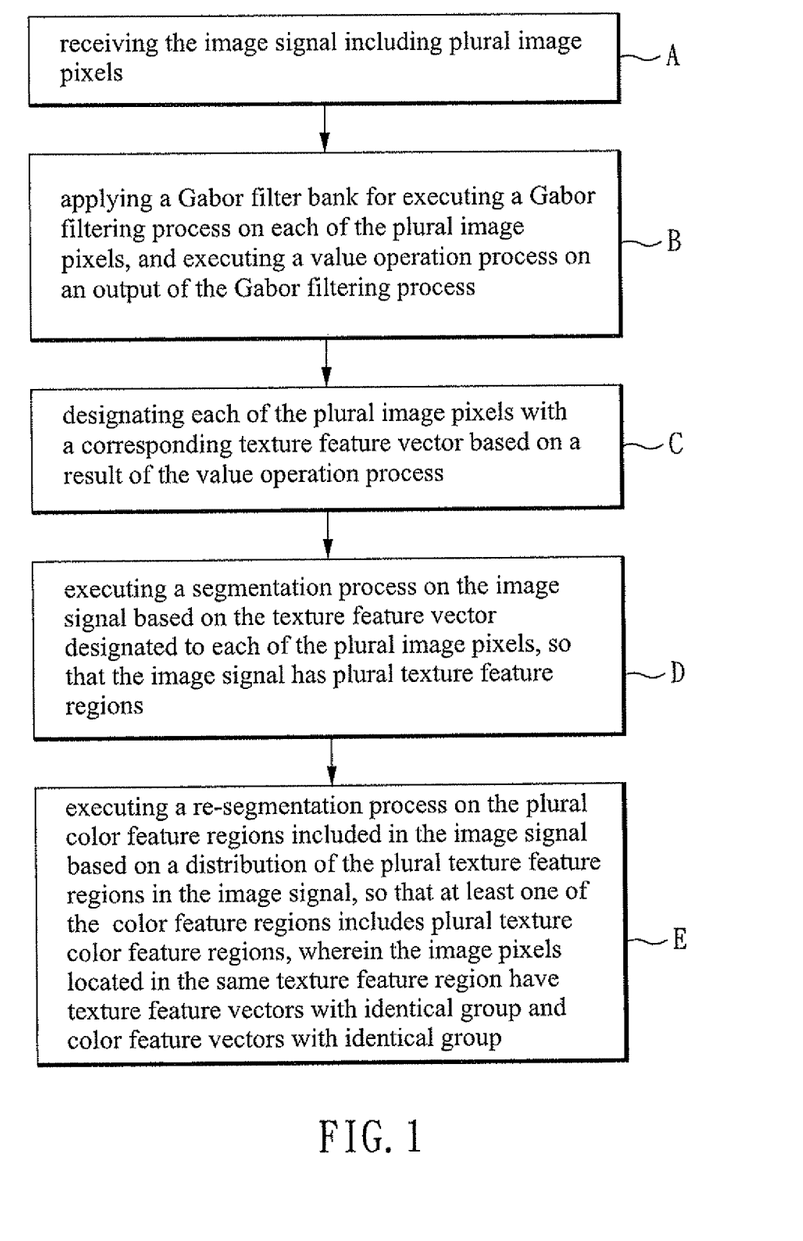
FIG. 1 illustrates a flow chart of steps during operation of the image segmentation method using texture features according to an embodiment of the present invention.

FIG. 1 is a flow chart of steps during operation of the image segmentation method using texture feature according to an embodiment of the present invention. As shown in the figure, the method for image/video segmentation using texture fea ture, adopted for segmenting an image signal into plural texture color feature regions, the method comprising the steps of:

(A) receiving the image signal including a plural image pixels;

(B) applying a Gabor filter bank for executing a Gabor filtering process on each of the plural image pixels, and executing a value operation process on an output of the Gabor filtering process;

(C) designating each of the plural image pixels with a corresponding texture feature vector based on a result of the value operation process;

(D) executing a segmentation process on the image signal based on the texture feature vector designated to each of the plural image pixels, so that the image signal has plural texture feature regions; and (E) executing a re-segmentation process on the plural color feature regions included in the image signal based on a distribution of the plural texture feature regions in the image signal, so that at least one of the color feature regions includes plural texture color feature regions.

Firstly, step (A) involves receiving the image signal including plural image pixels. In the present embodiment, there is no limitation on the format for the image signal, implying that an image signal represented by any format can be used in the present invention.

Step (B) is directed to applying a Gabor filter bank, executing a Gabor filtering process on each of the image pixels contained in the image signal, then executing a value operation process. In the present embodiment, the Gabor filtering bank includes an internal subband Gabor filter and an external subband Gabor filter, and the internal subbband Gabor filter and the external subband gabor filter each comprises six two-dimensional Gabor filter. As for the detailed operation method of a two-dimensional Gabor filter and how plural two-dimensional Gabor filters are distributed, since the Gabor filter (regardless of one-dimensional Gabor filter or two-dimensional Gabor filter) is commonly seen in various applications requiring filters, and their distribution is generally known to the persons of ordinary skills in the art, further details will not be provided here.

In another perspective, the aforementioned value operation process is the magnitude obtained from the Gabor filtering process.

Next, step (C) is individually designating a texture feature vector to each image pixel according to the output from the aforementioned value operation process, for which the number of dimensions for texture feature vector is equal to the number of two-dimensional Gabor filters used in the Gabor filtering process in step (B).

Furthermore, step (D) involves executing a segmentation process on the image signal so as to make the image signal have plural texture feature regions according to the texture feature vector designated to each image pixel. In the present embodiment, the segmentation process is to apply a K-means grouping algorithm. Because the detailed steps for carrying out the K-means grouping algorithm is already well known to the persons of ordinary skill in the art, further elaboration will not be presented.

Also, each of the plural image pixels located in identical texture feature region has identical texture feature vector belonging to identical group.

Lastly in step (E), a re-segmentation process is executed on the plural color feature regions contained by the image signal according to the distribution of the texture feature regions, such as their relative location in the image signal, so as to make at least the color feature region have plural texture color feature region. The re-segmentation process includes the following steps: (E1) comparing an area value of a color feature region with a re-segmentation threshold value; and (E2) when the area value of the color feature region is higher than the re-segmentation threshold value, the color feature region is re-segmented to the texture color feature region according the distribution of the texture feature regions in the image signal.

Embodiment 2

Figure 2:
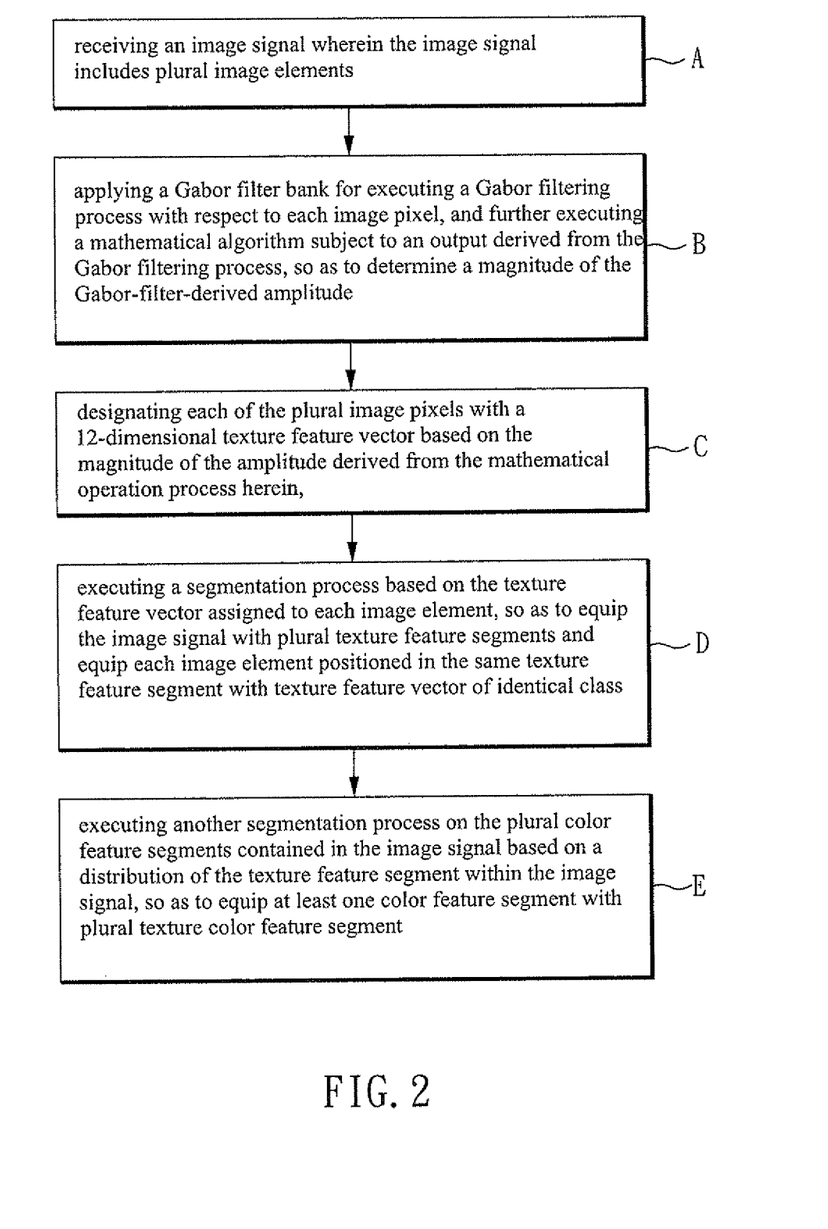
FIG. 2 illustrates a flow chart of steps during operation of the image segmentation method using texture features according to another embodiment of the present invention.

Turning now to FIG. 2, a flow chart of steps during operation of the image segmentation method using texture feature according to another embodiment of the present invention. As shown in FIG. 2, another embodiment of the present invention includes the following steps:

(A) receiving the image signal including plural image pixels;

(B) applying a Gabor filter bank for executing a Gabor filtering process on each of the plural image pixels, and executing a value operation process on an output of the Gabor filtering process, so as to obtain a level of magnitude outputting from the Gabor filtering process;

(C) designating each of the plural image pixels with a twelve-dimensional texture feature vector based on a result of the value operation process;

(D) executing a segmentation process on the image signal based on the texture feature vector designated to each of the plural image pixels, so that the image signal has plural texture feature regions, and each of the plural image pixels located in identical texture feature region has a texture feature vector of identical group; and (E) executing a re-segmentation process on the plural color feature regions included in the image signal based on a distribution of the plural texture feature regions in the image signal, so that at least one of the color feature regions includes plural texture color feature regions.

Step (A) hereof relates to receiving an image signal including plural image pixels. In the present embodiment, there is no limitation on the choice of signal format, which permits that an image signal represented by any format can be used in the present invention.

Next step (B) involves applying a Gabor filter bank for executing a Gabor filtering process on each of the plural image pixels, and executing a value operation process on an output of the Gabor filtering process, so as to obtain a level of magnitude outputting from the Gabor filtering process.

Figure 3:
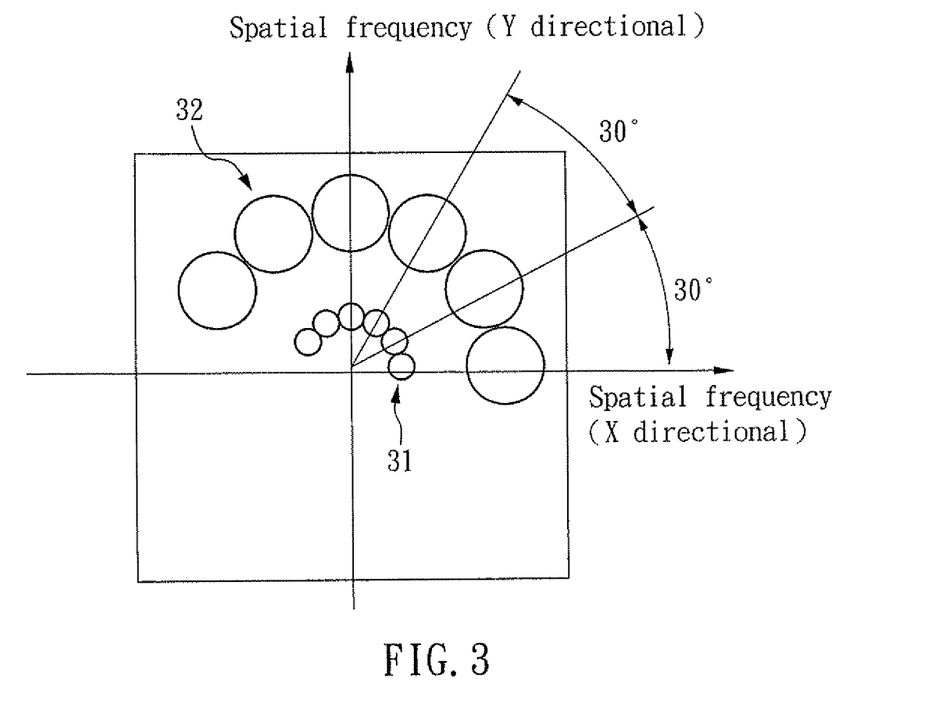
FIG. 3 shows a distribution arrangement for demonstrating the position of twelve two-dimensional Gabor filters on a space plane as from the Gabor filters used in the image segmentation method using texture feature according to an embodiment of the present invention.

In the present embodiment, the Gabor filter bank includes an internal subband Gabor filter bank 31 and an external subband Gabor filter bank, and the internal subband Gabor filter 31 and the external subband Gabor filter 32 each comprises six two-dimensional Gabor filters. The distribution of these twelve two-dimensional Gabor filters on the space plane can be referred to in FIG. 3, In addition, the twelve two-dimensional Gabor filters can each be described by the following formula:

$$g(x, y; \sigma_x, \sigma_y, \omega, \theta) = \frac{1}{2\pi\sigma_x\sigma_y} e^{-\frac{1}{2}\left(\left(\frac{x'}{\sigma_x}\right)^2 + \left(\frac{y'}{\sigma_y}\right)^2\right)} e^{j\omega x'};$$ (Formula 1)

wherein $\sigma_x$ and $\sigma_y$ each represents a Gaussian core standard deviation, $\omega$ represents a Fourier fundamental frequency, $\theta$ represents the direction of the 2-dimensional Gabor filter; while x', y', x, and y satisfy the following formulas:

$$x'=x\cos\theta+y\sin\theta$$ (Formula 2)

$$y'=-x\sin\theta+y\cos\theta$$ (Formula 3)

In addition in the present embodiment, the internal subband Gabor filter bank is composed of six 2-dimensional Gabor filters 31, and each of the standard deviations $\sigma_x$ and $\sigma_y$ is between 1.76 and 6.5. And the external sub-band Gabor filter bank is composed of six 2-dimensional Gabor filters, and each of the standard deviations $\sigma_x$ and $\sigma_y$ is between 1.76 and 4.5. Also, the Fourier fundamental frequency is preferred to be set at between 0.2 $\pi$ and 0.6$\pi$.

Turning now to FIG. 3, The longitudinal axis in FIG. 3 represents space frequency of x direction, and lateral axis represents space frequency of y direction. Each circle in FIG. 3 represents the distribution location of two-dimensional Gabor filter in a space frequency plane (frequency domain) having undergone a two-dimensional Fourier transformation, and is given a specific parameter ($\sigma_x$, $\sigma_y$, $\omega$, $\theta$). As will be understood by persons having ordinary skills in the art, six two-dimensional Gabor filters located in the inner circle comprise internal subband Gabor filter bank 31 and six two-dimensional Gabor filters located in the outer circle comprise external subband Gabor filter bank 32.

Furthermore, because the direction that a two-dimensional Gabor filter having an internal subband Gabor filter bank 31 extends to a two-dimensional Gabor filter having an external subband Gabor filter bank 32 makes up for a filtering direction, the Gabor filter bank in FIG. 3 shows six of such filtering directions. Wherein, these six filtering directions begin with a 0° as a starting angle, and assumes 30° as a regular spacing for every two filtering directions. Accordingly, the six filtering directions shown in FIG. 3 each represents 0°, 30°, 60°, 90°, 120°, and 150°.

In addition in the present embodiment, the values for $\sigma_x$ and $\sigma_y$ of the six two-dimensional Gabor filters of the internal subband Gabor filter bank 31 is each set at 2.75, and their Fourier fundamental frequency is set as 0.2$\pi$. In another perspective, the values for $\sigma_x$ and $\sigma_y$ of the six two-dimensional Gabor filters of the external subband Gabor filter bank 32 is each set at 2.75, and their Fourier fundamental frequency is set as 0.6$\pi$.

Accordingly, after an image signal is entered into the Gabor filter bank shown in FIG. 3, the Gabor filter bank will execute a Gabor filtering process to each image pixel. As such, when an image pixel passes a Gabor filtering process, such operation will result in twelve output values. Afterward, if undergoing through a value operation process, the operation will result in obtaining magnitude of twelve output values.

Sequentially, step (C) involves designating each of the plural image pixels with a twelve-dimensional texture feature vector based on a result of the value operation process. As such, the texture feature vector designated to the image pixel is a vector of twelve dimensionality, and the vector value of the twelve dimensional vector corresponds to the magnitude values of the aforementioned twelve output values.

Next in step (D), the operation involves executing a segmentation process according to the vector value of the twelve dimensional vectors, to make the image signal have plural texture feature regions. Also, each of the plural image pixels located in identical texture feature regions has texture feature vectors of identical group. In the present embodiment, the aforementioned segmentation process applies K-means grouping algorithm method to categorize texture feature vectors of identical group into the same group. Accordingly, original image signals having passed the segmentation process are segmented into a plural texture color feature regions, and these texture color feature regions can be distributed to any part within the entire domain of the image signal.

Figure 4:
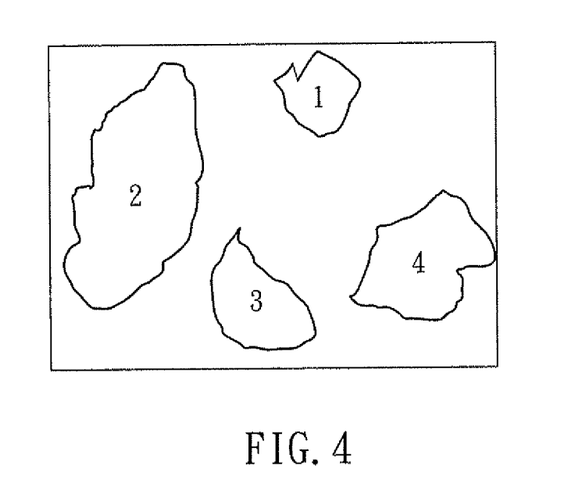
FIG. 4 shows the distribution arrangement of plural color feature regions in an image signal.
Figure 5:
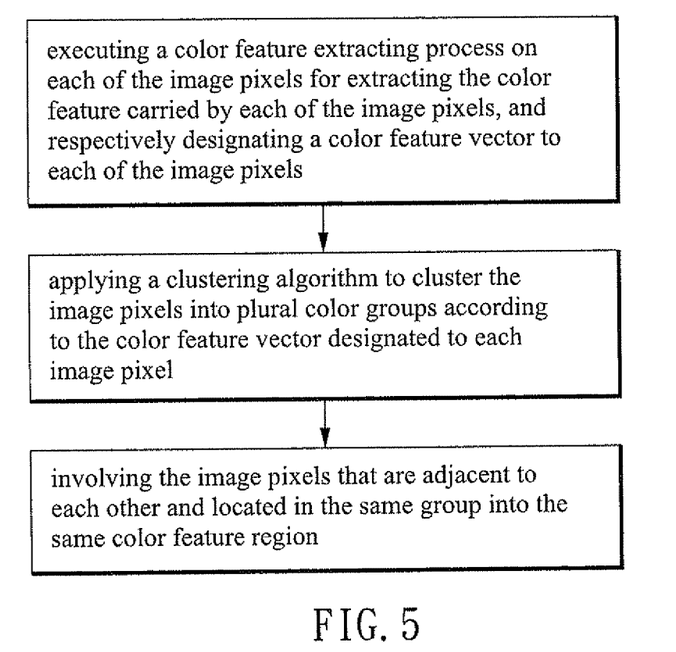
FIG. 5 illustrates a flow chart of steps during operation of the color feature capture method executed for obtaining plural color feature regions from an image signal in step (E) according to another embodiment of the present invention.

The following step (E) involves executing a re-segmentation process to the plural color feature regions contained in the image signal according to the distribution of image signals in the texture color feature regions. Wherein, FIG. 4 shows the distribution of the color feature regions in the image signal. Wherein, the image signal comprises four color feature regions, and each is labeled from one to four. As for the present embodiment, the operation works to capture these four color feature regions operate from an image signal through use of a color feature capture method. As shown in FIG. 5, the color feature capture method comprises the following steps: executing a color feature extracting process on each of the image pixels for extracting the color feature carried by each of the image pixels, and respectively designating a color feature vector to each of the image pixels;

applying a clustering algorithm to cluster the image pixels into plural color groups according to the color feature vector designated to each image pixel; and involving the image pixels that are adjacent to each other and located in the same group into the same color feature region.

However, the abovementioned method is not the only way for obtaining the four color feature regions as they can be obtained through the algorithm for obtaining the plural color feature regions common known to the persons of ordinary skills in the art. In another perspective, in the above color feature capture methods, the grouping algorithm used is the K-means grouping algorithm. Since the K-means grouping algorithm is commonly accepted in each field of technology, and is widely known to persons of relevant skills in the art, detailed procedure for performing K-means algorithm will not be elaborated.

Figure 6:
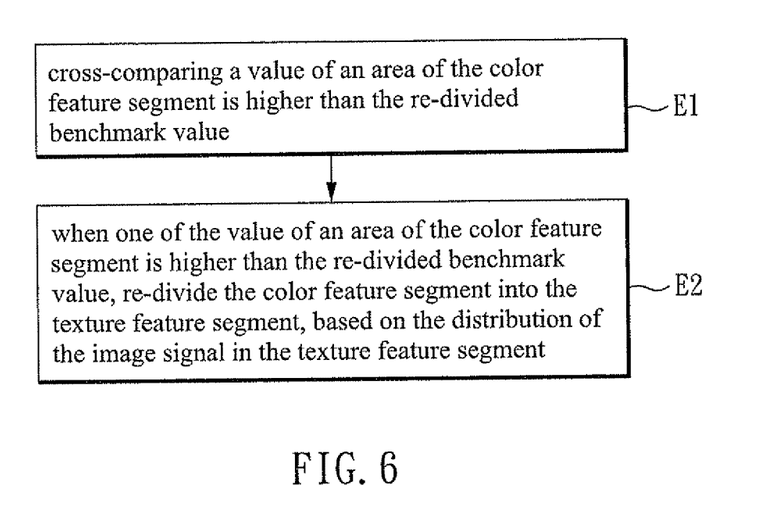
FIG. 6 illustrates a flow chart of steps during operation of the re-segmentation process needed in step (E) according to another embodiment of the present invention.

In addition, as shown in FIG. 6, the aforementioned re-segmentation method comprises the following steps:

(E1) comparing an area of each of the color feature regions with a re-segmentation threshold value; and (E2) re-segmenting the color feature region into texture color feature region according to the distribution of the texture feature region on the image signal when one of the areas of the color feature region is higher than the re-segmentation threshold value.

In the present embodiment, the aforementioned re-segmentation threshold value is set as 180. As such in the four color feature regions of FIG. 4, only the color feature regions labeled in 2 and 4 will be executed, meaning that the color feature region labeled in 2 can be re-segmented into three texture color feature regions labeled in 2, 5, and 6. As per the color feature region labeled in 7, the color feature region 7 is re-segmented into two texture color feature regions labeled in 4 and 7, as shown in FIG. 7.

Figure 7:
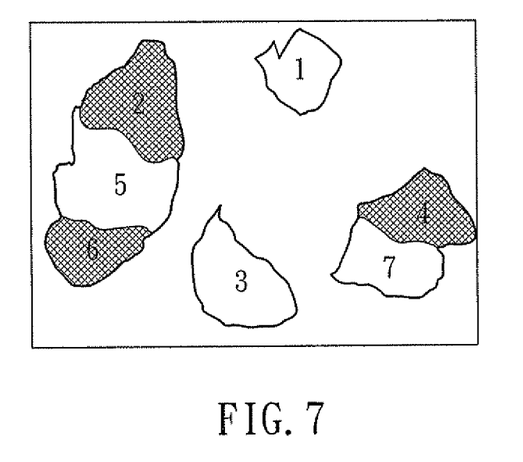
FIG. 7 shows an arrangement after a re-segmentation process, a further segmentation on the color feature regions of FIG. 4 into plural texture color feature regions.

Importantly, in the seven texture color feature regions of FIG. 7, each of the plural image pixels located in the same texture color feature regions has a texture feature vector of same group, and color feature vectors of same group.

It will be understood by examples illustrated in the above two embodiments that the image segmentation method using texture feature of the present invention can indeed combine the texture features of image signal (i.e. distribution of plural texture feature regions in the image signal) and color feature (i.e. distribution of plural color feature regions in the image signal), and using texture feature and color feature each has its own benefits, and segmenting an image signal into plural texture color feature regions can increase the accuracy of segmenting high image signal.

Although the present invention has been explained in relation to its preferred embodiment, it is to be understood that many other possible modifications and variations can be made without departing from the spirit and scope of the invention as hereinafter claimed.

What is claimed is:

1. A method for image/video segmentation using texture feature, adopted for segmenting an image signal into plural texture color feature regions, implemented by a computer, the method comprising the steps of:
   (A) receiving the image signal including plural image pixels;
   (B) applying a Gabor filter bank for executing a Gabor filtering process on each of the plural image pixels, and executing a value operation process on an output of the Gabor filtering process;
   (C) designating each of the plural image pixels with a corresponding texture feature vector based on a result of the value operation process;
   (D) executing a segmentation process on the image signal based on the texture feature vector designated to each of the plural image pixels, so that the image signal has plural texture feature regions; and
   (E) executing a re-segmentation process on the plural color feature regions included in the image signal based on a distribution of the plural texture feature regions in the image signal, so that at least one of the color feature regions includes plural texture color feature regions;
   wherein the image pixels located in the same texture feature region have texture feature vectors with identical group and color feature vectors with identical group, and wherein the Gabor filter bank is composed of an internal sub-band Gabor filter bank and an external sub-band Gabor filter bank.

2. The method for image/video segmentation using texture feature as claimed in claim 1, wherein each of the internal sub-band Gabor filter bank and the external sub-band Gabor filter bank is composed of plural 2-dimensional Gabor filters, while a number of the 2-dimensional Gabor filters of the internal sub-band Gabor filter bank is identical to that of the 2-dimensional Gabor filters of the external sub-band Gabor filter bank.

3. The method for image/video segmentation using texture feature as claimed in claim 2, wherein a number of filtering orientations of the Gabor filter bank is the number of the 2-dimensional Gabor filters of the internal sub-band Gabor filter bank.

4. The method for image/video segmentation using texture feature as claimed in claim 1, wherein the re-segmentation in step (E) comprises:
   (E1) comparing an area of each of the color feature regions with a re-segmentation threshold value; and
   (E2) re-segmenting the color feature region into texture color feature region according to the distribution of the texture feature region on the image signal when one of the areas of the color feature region is higher than the re-segmentation threshold value.

5. The method for image/video segmentation using texture feature as claimed in claim 4, wherein in step (E2), a clustering algorithm is applied for re-segmenting the color feature region into texture color feature region according to the distribution of the texture feature region on the image signal, and the clustering algorithm is selectively to be a K-means clustering algorithm, a CRLA clustering algorithm, and a SBKM clustering algorithm.

6. The method for image/video segmentation using texture feature as claimed in claim 2, wherein each of the 2-dimensional Gabor filters is described as the following formula:

$$g(x, y; \sigma_x, \sigma_y, \omega, \theta) = \frac{1}{2\pi\sigma_x\sigma_y} e^{-\frac{1}{2}\left(\left(\frac{x'}{\sigma_x}\right)^2 + \left(\frac{y'}{\sigma_y}\right)^2\right)} e^{j\omega x'}$$

wherein $\sigma_x$ and $\sigma_y$ each represents a Gaussian core standard deviation, $\omega$ represents a Fourier fundamental frequency, $\theta$ represents the direction of the 2-dimensional Gabor filter; while x', y', x, and y satisfy the following formula:

$x' = x \cos \theta y \sin \theta +$ $y' = x + \sin \theta y \cos \theta.$

7. The method for image/video segmentation using texture feature as claimed in claim 2, wherein the internal sub-band Gabor filter bank is composed of four to eight 2-dimensional Gabor filters.

8. The method for image/video segmentation using texture feature as claimed in claim 7, wherein the internal sub-band Gabor filter bank is composed of six 2-dimensional Gabor filters, and each of the standard deviations $\sigma_x$ and $\sigma_y$ is between 1.76 and 6.5.

9. The method for image/video segmentation using texture feature as claimed in claim 8, wherein the external sub-band Gabor filter bank is composed of six 2-dimensional Gabor filters, and each of the standard deviations $\sigma_x$ and $\sigma_y$ is between 1.76 and 4.5.

10. The method for image/video segmentation using texture feature as claimed in claim 1, wherein in step (E), the color feature regions included in the image signal are derived by:
    executing a color feature extracting process on each of the image pixels for extracting the color feature carried by each of the image pixels, and respectively designating a color feature vector to each of the image pixels;
    applying a clustering algorithm to cluster the image pixels into plural color groups according to the color feature vector designated to each image pixel; and
    involving the image pixels that are adjacent to each other and located in the same group into the same color feature region.

* * * * *